INVENTOR.
ROBERT L. SCHALLER.
BY
ATTORNEY.

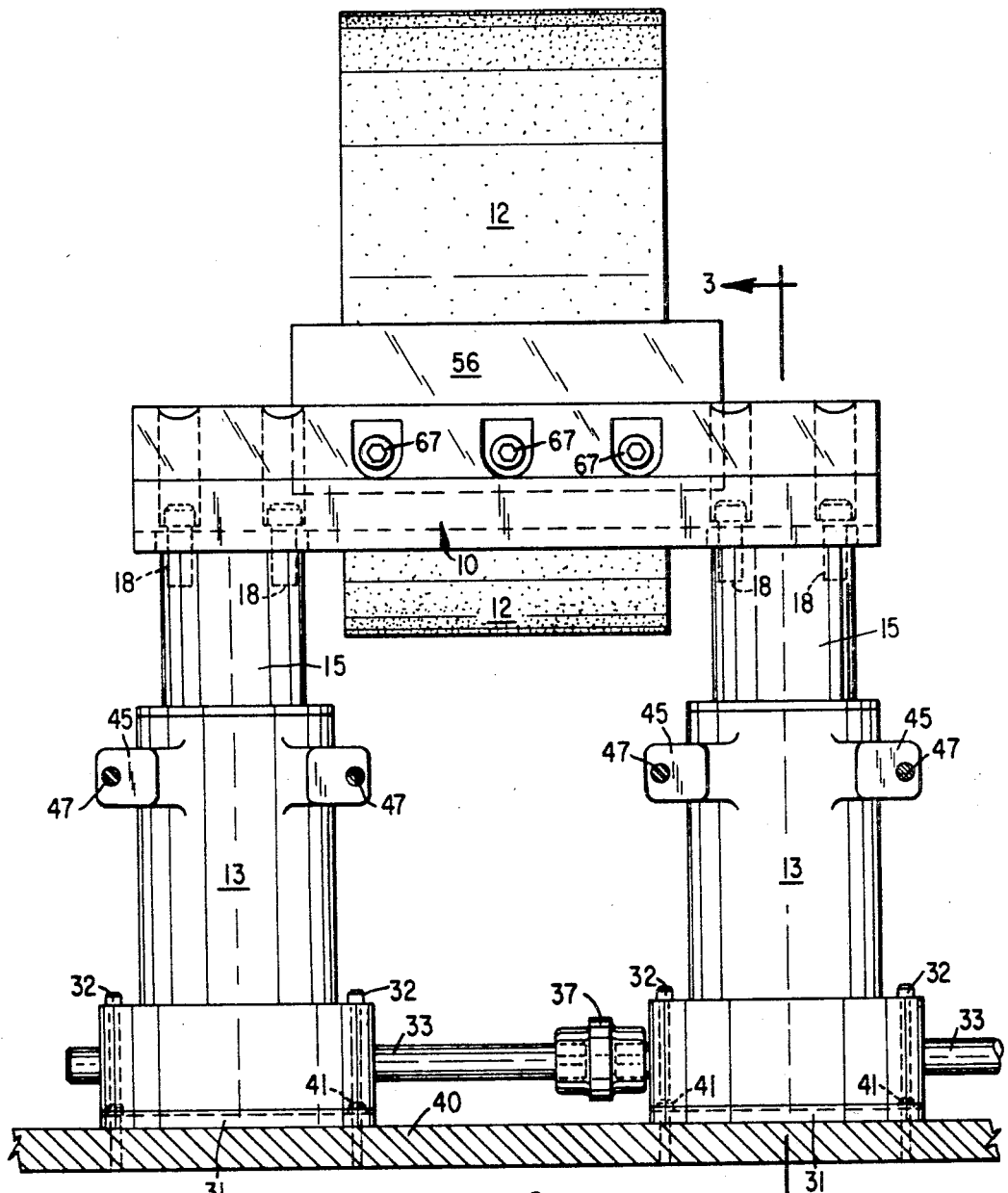

Sept. 16, 1969  R. L. SCHALLER  3,466,810
WORK REST STRUCTURE FOR CENTERLESS GRINDERS
Filed March 30, 1967  3 Sheets-Sheet 3

INVENTOR.
ROBERT L. SCHALLER.
BY
D. Emmett Thompson
ATTORNEY.

United States Patent Office 3,466,810
Patented Sept. 16, 1969

3,466,810
WORK REST STRUCTURE FOR CENTERLESS GRINDERS
Robert L. Schaller, Camillus, N.Y., assignor to Sundstrand Corporation, Belvidere, Ill., a corporation of Illinois
Filed Mar. 30, 1967, Ser. No. 631,568
Int. Cl. B24b 41/06, 5/18
U.S. Cl. 51—238         4 Claims

ABSTRACT OF THE DISCLOSURE

Work engaging blade carried by a support movable vertically on a linear path inclined toward the regulating wheel. The support is formed with a slot extending lengthwise of the workpiece. The blade is formed with shoulders engaging the top edges at the sides of the slot. The arrangement is such that one blade will accommodate workpieces varying in diameter over a large range.

BRIEF SUMMARY OF THE INVENTION

The invention is directed to a work rest structure for centerless grinders capable of grinding workpieces of varying diameters up to 20 inches without removing the blade from its support. The blade carrying support is movable along a linear path inclined toward the regulating wheel of the grinder. Usually, the work engaging surface of the blade extends perpendicular to the path on which the support is moved.

With this arrangement, the adjustment of the support and blade is linear. For example, in adjusting the support and blade from a position for grinding workpieces two inches in diameter to a position for grinding workpieces three inches in diameter, the blade is moved downwardly one-half inch, maintaining the axis of the workpiece on the same axis as the smaller work piece, this axis intercepting a plane extending through the axis of the grinding wheel and the axis on which the regulating wheel is mounted. This also permits straight linear adjustment of both the grinding wheel and the regulating wheel. Since the adjustment of the work rest, the grinding wheel and the regulating wheel to accommodate workpieces of different diameters are all linear functions, they can be set or controlled by a common numerically controlled servo mechanism. Accordingly, the grinding machine can be adjusted to accommodate bars of different diameters by simply adjusting the command servo control dial.

This work rest structure is particularly well adapted for centerless grinding machines capable of taking large grinding forces, as in grinding bars up to 20 inches in diameter. To this end, the work rest structure embodies a particularly rigid structural arrangement which functions to adequately support the workpiece.

Because of the linear movement of the work rest due to the angulated path of movement, dressing attachments can be mechanically attached to the work rest blade holder, or support, for the precision positioning of the dresser for dressing the regulating wheel.

BRIEF DESCRIPTION OF DRAWINGS

In the drawings
FIGURE 2 is a view taken on line 2—2, FIGURE 1.

DETAILED DESCRIPTION

Figure 1:
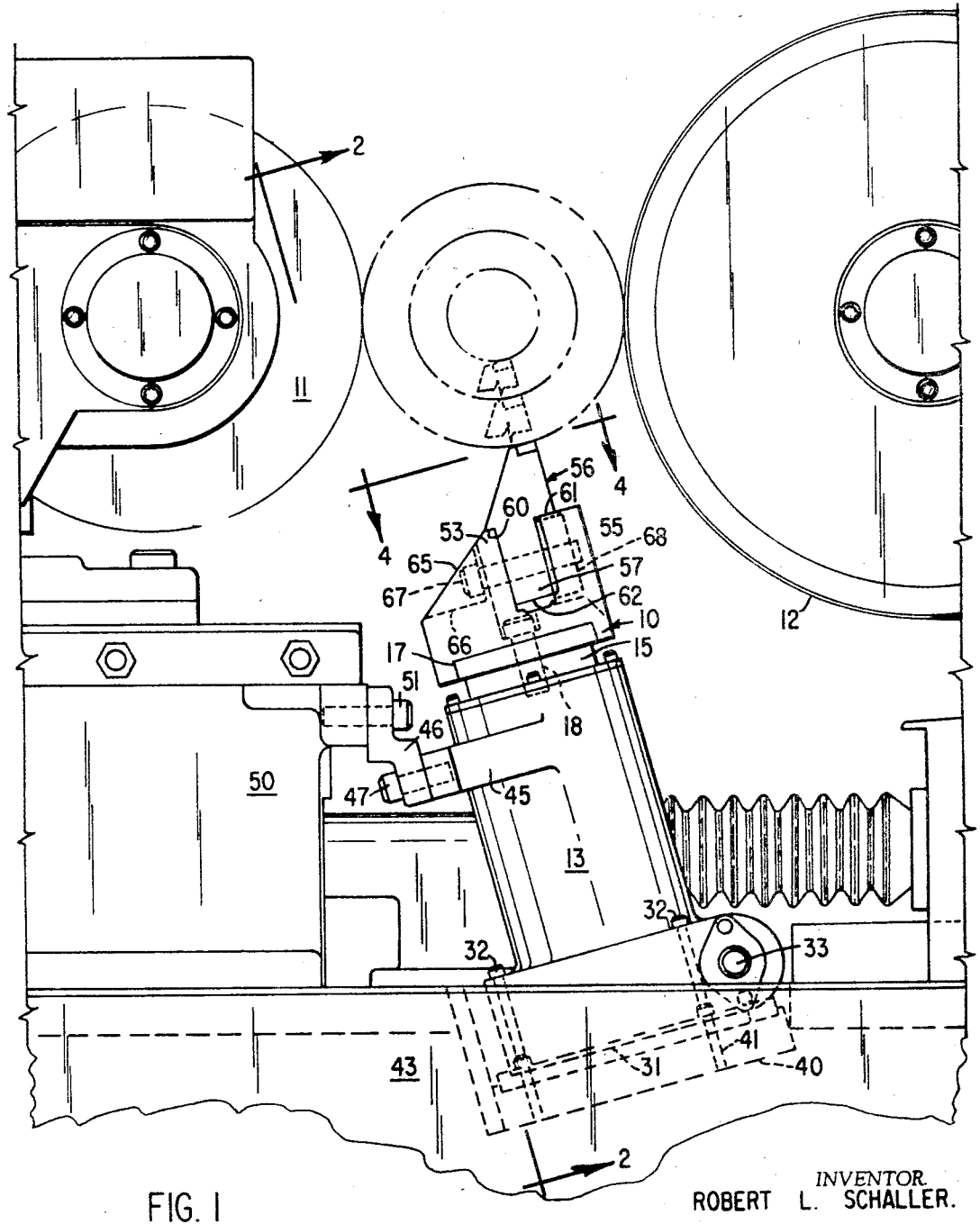
—
FIGURE 1 is an end elevational view of a work rest embodying my invention and including contiguous portions of the grinding machine.
Figure 4:
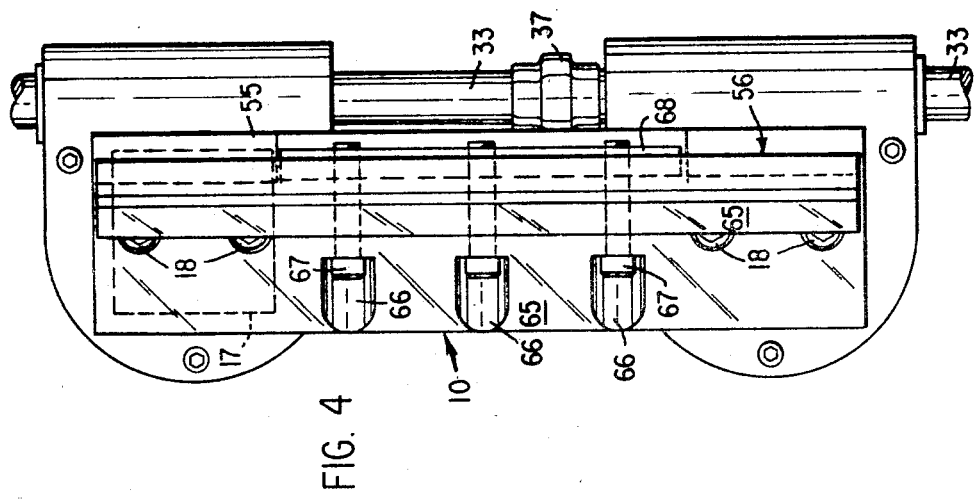
FIGURE 4 is a view taken on line 4—4, FIGURE 1.

The work rest consists of a support member 10 positioned intermediate the regulating wheel 11 and the grinding wheel 12. The support 10 is carried by means operable to move the support vertically along a linear path inclined toward the regulating wheel 11.

Power operated means is provided to effect adjustment of the work rest. In the arrangement shown, the support 10 is adjusted vertically by a pair of jack structures, each of which includes a housing 13 formed with an axial bore to slidably receive a ram 15. The upper ends of the rams 15 are formed with head portions 17 of rectangular formation. The under side of the support 10 is formed with a lengthwise extending slot dimensioned to receive the ram heads 17 to which the support is secured by screws 18.

Figure 3:
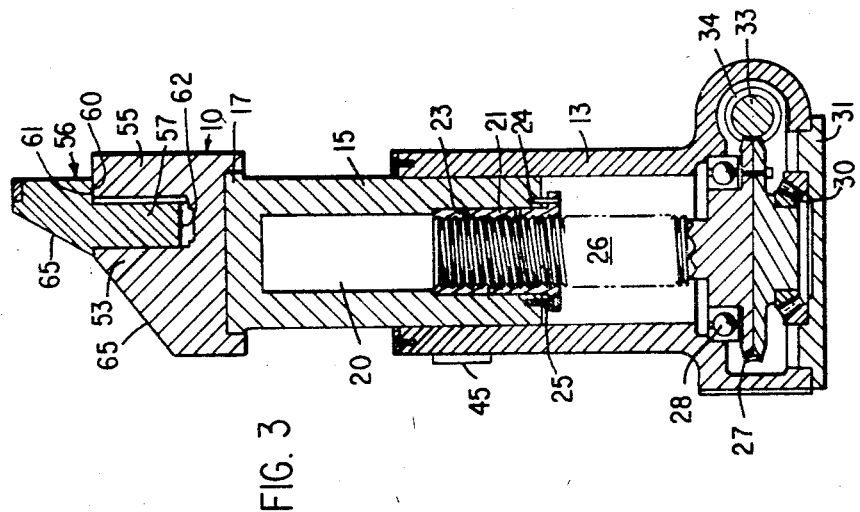
FIGURE 3 is a view taken on line 3—3, FIGURE 2.

Each of the rams 15 is formed with an axially extending bore 20, the lower portion of which is enlarged to receive a cylindrical nut 21, the upper end of which seats against the top shoulder of the counterbore. The nut may be formed with one or more chordally disposed slots 23, and the nut is restrained against rotation in the ram by a pin 24. The nut is fixed in the ram by screws 25, one of which is shown in FIGURE 3. By tightening the screws 25, portions of the nut may be displaced axially to effect a snug fit between the nut and the threads on a screw 26 to prevent lost motion between the screw and the nut.

In the arrangement shown in FIGURE 3, the lower end of the screw 25 is formed with a worm wheel 27, the hub portion of which is journalled in bearing 28, and the lower end of the gear hub is journalled in a thrust bearing 30 mounted in a cap 31, secured to the lower end of the housing 13 by screws 32, see FIGURES 1 and 2. A shaft 33 is journalled in the lower end of the housing and is provided with a worm 34 engaging the gear 27. The shafts 33 are connected by a coupling 37, whereby the worms 34 are rotated in unison to effect elevation of the rams 15 in unison.

The housings are affixed to a plate 40 by screws 41. The plate 40 forms an integral part of the machine frame 43, see FIGURE 1. The plate 40 is inclined to effect inclination of the axes of the rams 15 toward the regulating wheel 11. The housings 13 are formed with lugs 45 fixed to brackets 46, as by screws 47, the brackets being fixedly secured to the regulating wheel supporting framework 50, as by screws 51.

The support 10 is formed in its upper side with a wall 53 extending along the forward side of the support. The support is also formed at its rear side with walls 55, these being positioned at each end of the support. The walls 55 are spaced rearwardly from the wall 53 to provide a slot in which the work engaging blade 56 is positioned. The blade 56 is formed with a tongue portion 57 positioned in the slot between the walls 53, 55. The blade is formed with a shoulder 60 positioned on the top edge of the wall 53, and with a shoulder 61 positioned on the top edges of the walls 55. The bottom 62 of the tongue 57 terminating a short distance above the bottom of the slot between the walls 53, 55, whereby the blade 56 is supported by shoulders 60, 61, engaging the top edges of the walls 53, 55.

The forward surface of the wall 53 inclines downwardly, as at 65, FIGURES 1 and 3. This inclined surface is formed with recesses 66 to receive the heads of screws 67, which extend through apertures in the wall 53, and apertures formed in the tongue 57 of the blade 56. The screws thread into a plate 68, the arrangement serving to fixedly clamp the blade 56 against the forward wall 53. The apertures in the blade 56 are slightly larger than the screws 67 to permit the shoulders 60, 61, of the blade to rest on the top edges of the walls 53, 55.

This work rest structure, as previously stated, is intended for use in a precision grinding machine capable of grinding workpieces of large diameters. It is accordingly essential that the work rest blade be positioned with extreme accuracy relative to the grinding axis which is located in the horizontal plane passing through the axes on which the regulating wheel and the grinding wheel are mounted. Accordingly, it is important that no dirt, or foreign matter, exists between the shoulders of the blade and the top edges of the walls 53, 55. This can be assured of by simply wiping off the top edges of the walls.

What I claim is:

1. A work rest structure for centerless grinders comprising a support positioned intermediate the grinding wheel and the regulating wheel of the grinder, a work engaging blade fixedly mounted on said support, said support being mounted in a fixed housing for vertical sliding movement therein on a fixed linear path inclined toward the regulating wheel, said linear path extending upwardly intermediate said regulating wheel and grinding wheel, screw jack means positively connected to said support for raising and retaining the same and said blade along said fixed linear path for positioning the blade.

2. A work rest structure as defined in claim 1, wherein said screw jack means is mounted in said housing.

3. A work rest structure as defined in claim 1, wherein a pair of screw jacks are mounted in said housing, and means for operating said screw jacks in unison.

4. A work rest structure for centerless grinders comprising a support positioned intermediate the grinding wheel and the regulating wheel of the grinder, said support being fixedly secured to a pair of rams, said rams being movable in a fixed linear path inclined toward the regulating wheel, said path extending intermediate said regulating wheel and grinding wheel, a screw jack operatively connected to each of said rams to effect positive reciprocation of said support on said linear path, a work rest blade fixedly mounted on said support and being formed with a work engaging surface extending in a direction substantially perpendicular to said linear path, and means for operating said screw jack in unison to adjust said support and blade along said path for positioning the blade.

References Cited

UNITED STATES PATENTS

| | | | |
|---|---|---|---|
| 1,585,984 | 5/1926 | Heim | 51—238 X |
| 1,691,061 | 11/1928 | Heim | 51—238 |
| 2,000,586 | 5/1935 | Foerster | 51—103 |
| 2,427,283 | 9/1947 | Hopkins | 51—103 |
| 2,449,488 | 9/1948 | Krueger | 51—103 X |
| 2,897,636 | 8/1959 | Pyne | 51—103 |

HAROLD D. WHITEHEAD, Primary Examiner